Dec. 6, 1932.        E. LEFKOWITZ        1,890,061
HOSE COUPLING
Filed May 31, 1930

INVENTOR
Emanuel Lefkowitz
BY
ATTORNEY

Patented Dec. 6, 1932

1,890,061

UNITED STATES PATENT OFFICE

EMANUEL LEFKOWITZ, OF CARTERET, NEW JERSEY

HOSE COUPLING

Application filed May 31, 1930. Serial No. 458,470.

This invention relates to a hose coupling and is an improvement of the invention described in my patent application for hose coupling, filed April 24, 1929, bearing Serial Number 357,711.

The object of the invention is the production of a coupling whereby a pair of conduits or members for a fluid can be quickly and tightly connected. The second object of the invention is the production of a coupling, having means to grip a movable member at a plurality of portions thereof to its accompanying member. The third object of the invention is the production of a coupling adapted to quickly connect a line of hose to a fire engine. The fourth object of the invention is the production of a coupling to connect the feed line for a tank on a pier or the like to a line of hose leading from a vessel. The fifth object of the invention is the production of a coupling the members of which can be easily connected or separated without operating any threaded connections. The sixth object of the invention is the production of a coupling with loosely connected elements to tightly secure a movable member thereof to a normally stationary member irrespective of imperfections in said members and elements.

Figure 1:
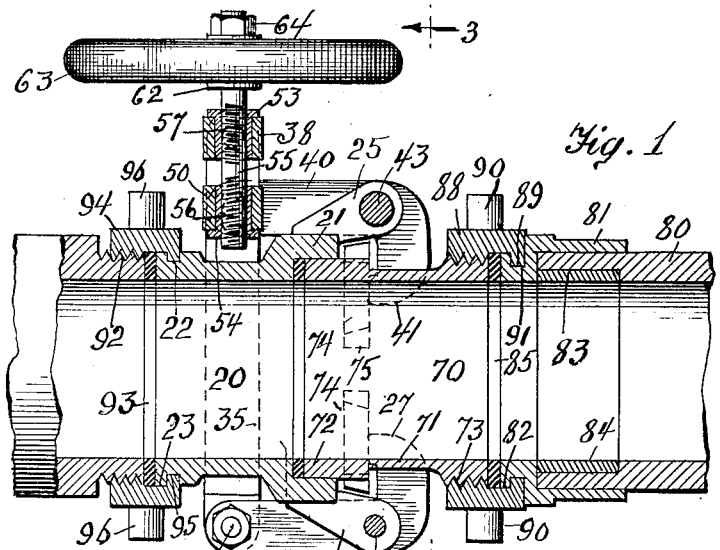
Figure 2:
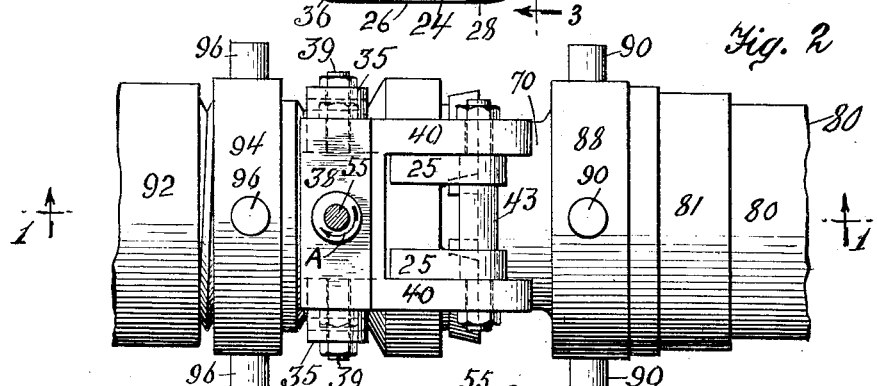
Figures 3, 4:
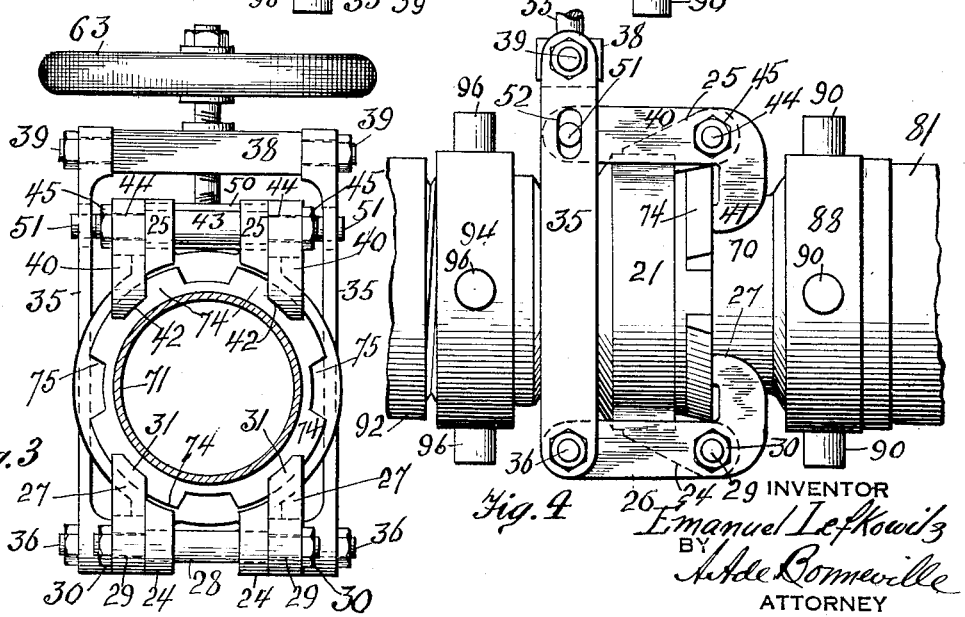

In the accompanying drawing Fig. 1 represents a partial elevation and partial section as on the line 1, 1, of Fig. 2 of an exemplification of the improved coupling; Fig. 2 is a top plan view of the improved coupling partly in section; Fig. 3 shows a section as on the line 3, 3 of Fig. 1 and Fig. 4 shows a side elevation of the improved coupling.

The coupling comprises the central cylindrical normally stationary member or body portion consisting of the shell 20 having the bell end 21, the groove 22 and the flange 23. Ears 24 extend from the lower portion of the bell end 21 of the shell 20, and ears 25 extend from the upper portion thereof. A pair of lower clamping levers 26 each having a clamping hook 27 are pivoted, preferably loosely, to the ears 24, by means of the pivot pin 28 having the shanks 29. The shanks 29 are threaded at their ends for the nuts 30. Each clamping hook 27 has a tapered end 31.

Normally vertical links 35 have their lower ends pivoted, preferably loosely to the clamping levers 26, by means of the pivots 36. To and between the upper ends of the links 35 is pivoted the upper cross bar 38, preferably loosely, by means of the pins 39. A pair of upper clamping levers 40 each having a clamping hook 41 with the tapered ends 42 are pivoted preferably loosely to the ears 25, by means of the pivot pin 43, having the shanks 44. The shanks 44 are threaded at their ends for the nuts 45. A second and lower cross bar 50, below the cross bar 38 is pivoted, preferably loosely, to the upper clamping levers 40, by means of the pins 51, which extend, preferably loosely, through the elongated openings 52 in the links 35. An interiorly threaded bushing 53 is tightly supported in the upper cross bar 38, and an interiorly threaded bushing 54 is tightly supported in the second cross bar 50. An operating spindle 55 has formed therewith at its lower end the right hand thread 56 and adjacent its upper end is formed the left hand thread 57.

The thread 56 is in threaded engagement with the bushing 54, and the thread 57 is in threaded engagement with the bushing 53. A collar 62 extends from the spindle 55. An operating hand wheel 63 is supported on the spindle 55 and is held in place by means of the nut 64 which is in threaded engagement with the upper end of said spindle 55.

An adapter or movable member is designated in its entirety by the numeral 70. The said adapter comprises the shell 71 having the thickened abutting end portion 72 and the thread 73 at its other end. Lugs 74 spaced from each other extend from the thickened portion 72 and form between them the clearance spaces 75.

A line of hose 80 is connected to the sleeve 81, having the flange 82 and the groove 83. The hose 80 is connected to the sleeve 81 by the ring 84 in the usual manner. A gasket 85 of pliable material is interposed between the flange 82 and the adjacent end of the adapter 70.

A swivel nut 88 is indicated with the flange 89 and the pins 90. The flange 89 engages the groove 91 of the adapter 70 and is in threaded engagement with the thread 73. By means of the swivel nut 88 the sleeve 81 is clamped to the adapter 70.

A threaded nipple is indicated at 92. A pliable gasket 93 is interposed between the nipple 92 and the adjacent end face of the body portion 20. A swivel nut 94 is shown with the flange 95 which engages the groove 22. Pins 96 extend from the nut 94. The swivel nut 94 is in threaded engagement with the nipple 92, and thereby the body portion 20 can be clamped to said nipple 92.

To use the coupling, the body portion 20 is previously connected to the threaded nipple 92, by means of the swivel nut 94. One end of the adapter 70 is located in the bell end 21 of the body portion 20. The clearance spaces 75 enable the adapter 70 to be slightly turned to clear the clamping hooks 27 and 41, when placed in operative position.

The operator then turns the operating hand wheel 63 in the direction of the arrow A, which lowers the upper cross bar 38 and simultaneously raises the second cross bar 50, whereby the clamping hooks 27 and 41 bear against the lugs 74 and clamp the adapter 70 with its appurtenances in place. It is to be noted that the looseness of the connections described may not be required.

It will be noted that the looseness of the pivoted connections as described provide the clamping levers 26 and 40 with their respective clamping hooks 27 and 41 with equalizing means, so that said hooks will simultaneously and evenly bear against the lugs 74.

Various modifications may be made in the invention and the present exemplification is to be taken as illustrative and not limitative thereof.

Having described my invention what I desire to secure by Letters Patent and claim is:

1. In a coupling of the character described the combination of a body portion comprising a shell, a bell end formed with said body portion, upper and lower clamping levers pivoted to said body portion, a clamping hook at one end of each clamping lever, a pair of vertical links, the lower ends of said links pivoted to the lower clamping levers, an upper cross bar connecting said links, a second and lower cross bar in pivotal connections with the upper clamping levers and said links, an operating spindle coacting with said cross bars, an adapter with one end thereof positioned within said bell end of said body portion and lugs extending from said adapter positioned under said hooks, adapted to force said adapter against said body portion.

2. In a coupling of the character described the combination of a normally stationary body portion comprising a shell, a bell end formed with said body portion, upper and lower clamping levers loosely pivoted to said body portion, a clamping hook at one end of each clamping lever, a pair of links, the lower ends of said links loosely pivoted to the lower clamping levers, an upper cross bar loosely connecting said links, a second and lower cross bar in loose pivoted connection with the upper clamping levers and said links, a bushing having a left hand thread supported in the upper cross bar, a bushing having a right hand thread supported in the second and lower cross bar, an operating spindle having a right hand thread and a left hand thread, said threads respectively in threaded engagement with the thread of the lower cross bar and upper cross bar, an operating hand wheel supported on said operating spindle, an adapter with one end thereof positioned within said bell end of said body portion, lugs extending from said adapter adapted to be positioned under said hooks and a gasket located in said bell end adapted to bear between the said body portion and the adjacent end of said adapter, the said hooks bearing against said lugs when said operating wheel is turned in one direction to tightly clamp said adapter in place in said bell end.

3. In a coupling of the character described the combination of a body portion, pairs of clamping levers pivoted to said body portion, a pair of links, one pair of said levers pivoted to said links, a cross bar pivoted to said links, a second cross bar extending through said links and parallel to the first cross bar and pivoted to the other pair of clamping levers and an operating spindle coacting with both of said cross bars to move said clamping levers.

Signed at the borough of Manhattan, city of New York, in the county of New York and State of New York this 23d day of May A. D. 1930.

EMANUEL LEFKOWITZ.